United States Patent
Kobayashi et al.

(10) Patent No.: US 8,524,418 B2
(45) Date of Patent: Sep. 3, 2013

(54) POLYMER ELECTROLYTE FUEL CELL

(75) Inventors: Kenji Kobayashi, Tokyo (JP); Hidekazu Kimura, Tokyo (JP); Takanori Nishi, Tokyo (JP)

(73) Assignee: NEC Corporation, Tokyo (JP)

(*) Notice: Subject to any disclaimer, the term of this patent is extended or adjusted under 35 U.S.C. 154(b) by 361 days.

(21) Appl. No.: 12/527,812

(22) PCT Filed: Feb. 13, 2008

(86) PCT No.: PCT/JP2008/052365
§ 371 (c)(1),
(2), (4) Date: Aug. 19, 2009

(87) PCT Pub. No.: WO2008/105237
PCT Pub. Date: Sep. 4, 2008

(65) Prior Publication Data
US 2010/0055510 A1 Mar. 4, 2010

(30) Foreign Application Priority Data
Feb. 22, 2007 (JP) ................. 2007-042374

(51) Int. Cl.
  H01M 8/02 (2006.01)
  H01M 8/10 (2006.01)
  H01M 8/22 (2006.01)

(52) U.S. Cl.
  USPC .......................... 429/515; 429/483

(58) Field of Classification Search
  USPC .............. 429/483, 492–494, 506, 515
  See application file for complete search history.

(56) References Cited

U.S. PATENT DOCUMENTS

| | | | |
|---|---|---|---|
| 6,936,361 B2 * | 8/2005 | Kelley et al. | 429/413 |
| 7,625,649 B1 * | 12/2009 | Faghri et al. | 429/413 |
| 2004/0209133 A1 | 10/2004 | Hirsch et al. | |
| 2006/0040147 A1 | 2/2006 | Yamaguchi | |
| 2006/0093876 A1 * | 5/2006 | Kabasawa et al. | 429/12 |
| 2006/0141322 A1 | 6/2006 | Ishida et al. | |
| 2006/0222926 A1 | 10/2006 | Sato | |
| 2007/0059575 A1 | 3/2007 | Kan et al. | |
| 2008/0233438 A1 | 9/2008 | Yagi et al. | |

FOREIGN PATENT DOCUMENTS

| | | |
|---|---|---|
| JP | 63005506 | 1/1988 |
| JP | 2004-095376 | 3/2004 |
| JP | 2005-203335 | 7/2005 |
| JP | 2005-222760 | 8/2005 |

(Continued)

OTHER PUBLICATIONS

IPDL Machine Translation of the Detailed Description of JP 2006-318712A (Nov. 2006).*

(Continued)

*Primary Examiner* — Gregg Cantelmo
(74) *Attorney, Agent, or Firm* — Young & Thompson

(57) ABSTRACT

A polymer electrolyte fuel cell includes a power generation part as an electrolyte membrane-electrode assembly formed of a solid polymer electrolyte membrane, a fuel electrode arranged in contact with one side of the solid polymer electrolyte membrane and an oxygen electrode arranged in contact with the other side of the membrane, and a fuel supply part for storing and supplying an alcohol fuel to the fuel electrode. The fuel supply part is composed of a high-concentration fuel tank for storing and supplying a highly-concentrated fuel and a water fuel tank for storing and supplying a water fuel. The fuel is gasified and supplied to the power generation part through a fuel gasification/supply layer provided between at least the high-concentration fuel tank and the fuel electrode.

2 Claims, 5 Drawing Sheets

(56) References Cited

FOREIGN PATENT DOCUMENTS

| JP | 2006-059624 | 3/2006 |
| JP | 2006-185783 | 7/2006 |
| JP | 2006-202774 | 8/2006 |
| JP | 2006-278130 | 10/2006 |
| JP | 2006-278159 | 10/2006 |
| JP | 2006-523938 | 10/2006 |
| JP | 2006-318712 | 11/2006 |
| JP | 2007087646 A * | 4/2007 |
| WO | WO2005/112172 | 11/2005 |
| WO | WO 2007/080763 | 7/2007 |

OTHER PUBLICATIONS

International Search Report, PCT/JP2008/052365, Jun. 3, 2008.

* cited by examiner

AREA FACING WATER FUEL TANK 4    AREA FACING HIGH-CONCENTRATION FUEL TANK 3

AREA FACING WATER FUEL TANK 4    AREA FACING HIGH-CONCENTRATION FUEL TANK 3

POLYMER ELECTROLYTE FUEL CELL

TECHNICAL FIELD

Reference to Related Application

This application is based upon and claims the benefit of the priority of Japanese patent application No. 2007-042374, filed on Feb. 22, 2007, the disclosure of which is incorporated herein in its entirety by reference thereto.

This invention relates to a polymer electrolyte fuel cell in which an alcohol fuel is gasified and supplied, and particularly relates to a cell structure of a polymer electrolyte fuel cell in which an alcohol fuel is gasified and supplied.

BACKGROUND ART

Nowadays, a lot of investigations about a polymer electrolyte fuel cell using an alcohol fuel are performed vigorously for a power source of various kinds of electronic apparatuses, such as a mobile device, since a reduction in size and weight of the fuel cell and the apparatus can be easily realized.

A polymer electrolyte fuel cell comprises a membrane and electrode assembly (MEA) in which a solid polymer electrolyte membrane is sandwiched between a fuel electrode and an oxygen electrode. A fuel cell in which a liquid fuel is directly supplied to the fuel electrode is called a direct fuel cell, and the liquid fuel supplied is decomposed into hydrogen ions, electrons and intermediate products by a catalyst held on the fuel electrode. The hydrogen ions migrate to the oxygen electrode through the solid polymer electrolyte membrane and the electrons are transferred to the oxygen electrode through an external load. The hydrogen ions and electrons react with oxygen in the air on the oxygen electrode and generate an electric power. For example, reactions indicated as chemical equations (1) and (2) occur on the fuel electrode and the oxygen electrode, respectively, in a direct-methanol fuel cell (hereinafter called DMFC) that uses an aqueous methanol solution directly as a liquid fuel.

[Chemical equation 1]

$$CH_3OH + H_2O \rightarrow CO_2 + 6H^+ + 6e^- \qquad (1)$$

[Chemical equation 2]

$$6H^+ + 6e^- + 3/2 O_2 \rightarrow 3H_2O \qquad (2)$$

Related Patent Documents are as follows.
[Patent Document 1]
JP Utility Patent Kokai Publication No. U63-5506
[Patent Document 2]
JP Patent Kokai Publication No. JP2004-95376A
[Patent Document 3]
JP Patent Kokai Publication No. JP2006-59624A
[Patent Document 4]
JP Patent Application No. 2006-007657 (Gazette of International Publication No. W02007/080763)
[Patent Document 5]
JP Patent Kokai Publication No. JP2006-278159A

SUMMARY

The entire disclosures of Patent Documents 1 to 5 are incorporated herein by reference thereto. The following analyses are given by the present invention.

To generate electricity stably by a fuel cell utilizing the reactions according to the above equations, it is necessary to supply sufficient amount of alcohol fuel, such as methanol, constantly to the fuel electrode in the MEA. Since the catalyst on an oxygen electrode of a proton-conductive polymer electrolyte fuel cell operated by the alcohol fuel is limited to a platinum-type catalyst that is highly active at the oxygen electrode, a cross-over phenomenon, in which an unreacted fuel migrates from the fuel electrode to the oxygen electrode and reacts with the platinum-type catalyst causing a voltage reduction and heat generation, becomes a problem when a highly-concentrated fuel is used. Therefore, systems have been proposed to overcome this problem in Patent Documents 1 to 3, in which systems two fuel containers for a highly-concentrated fuel and a low-concentrated fuel are provided and the fuels are transferred to another room using a pump, etc., and mixed into an fuel of an appropriate concentration which causes little cross-over phenomenon and the mixed fuel is supplied to the fuel electrode. However, the systems still have problems that they require complicated structures and a close control of the fuel concentration.

On the other hand a cell structure for gasifying and supplying a fuel has been proposed as a method to use highly-concentrated fuel directly. Patent Documents 4 and 5 disclose cell structures each having a fuel gasifying/supply layer between a fuel container and a fuel electrode, and a $CO_2$ gas discharge port on a side of the fuel electrode.

In these systems, a methanol fuel is supplied from the fuel layer in the form of vapor and water produced at the oxygen electrode is transferred to the fuel electrode by reverse-diffusion. However, these systems have a problem that the cell voltage becomes unstable when ambient temperature of power-generator or load current changes significantly since the amount of diffused water from the oxygen electrode fluctuates correspondingly.

According to an aspect of the present invention, it is an object to provide a fuel cell using a highly-concentrated fuel with a gasifying and supplying system, in which water is supplied to a fuel electrode stably to achieve excellent power generation properties. In another aspect of the present invention, it is another object to achieve good storage properties, too.

The present invention offers a polymer electrolyte fuel cell comprising a power generation part as an electrolyte membrane-electrode assembly having a solid polymer electrolyte membrane, a fuel electrode arranged in contact with one side of the solid polymer electrolyte membrane and an oxygen electrode arranged in contact with the other side of the membrane, a fuel supply part for storing and supplying an alcohol fuel to the fuel electrode, wherein the fuel supply part is characterized in that it is composed of a high-concentration fuel tank for storing and supplying a highly-concentrated fuel and a water fuel tank for storing and supplying a water fuel.

The highly-concentrated fuel means a fuel having a high concentration capable of producing a practical output and energy density of a fuel cell, and particularly it means an alcohol fuel having an initial alcohol concentration (concentration at initial fuel injection) of 30% v/v or more. The water fuel is used for supplying water separately from the highly-concentrated fuel. And a lower initial alcohol concentration is better and no alcohol concentration is the best for the water fuel; however, it is not necessarily to be zero.

Preferably, the initial alcohol concentration of the highly-concentrated fuel is larger than a molar ratio of the alcohol to water that is necessary for the reaction of the alcohol and water at the fuel electrode, and the initial alcohol concentration of the water fuel in the water fuel tank is lower than the molar ratio. The molar ratio of the alcohol to water, that is necessary for the reaction of the alcohol and water at the fuel electrode, is 1:1 when a methanol is used for the fuel, for example, because the following reaction occurs at the fuel electrode.

$$CH_3OH+H_2O \rightarrow CO_2+6H^++6e^-.$$

More preferably, the initial alcohol concentration of the highly-concentrated fuel is 70% v/v or more and the initial alcohol concentration of the water fuel in the water fuel tank is zero.

Preferably, a ratio of volume of the high-concentration fuel tank to the volume of the water fuel tank is 4 or more.

The polymer electrolyte fuel cell of the present invention is provided with a fuel gasification/supply layer composed of a porous body having gas-liquid separation properties and one or two pored plates to support the porous body between the two fuel tanks and the fuel electrode or between the high-concentration fuel tank and the fuel electrode. The porous body having gas-liquid separation properties is used for gasification/supply of the fuel.

Preferably, the porous body of the fuel gasification/supply layer at the high-concentration fuel tank is either water-repellent or hydrophilic porous body, or has a stacked structure in which a water-repellent porous body and a hydrophilic porous body are piled up one after another from the high-concentration fuel tank side.

Preferably, the porous body of the fuel gasification/supply layer at the water fuel tank is a water-repellent porous body, or has a stacked structure in which a water-repellent porous body and a hydrophilic porous body are piled up one after another from the water fuel tank side.

The pored plate(s) are provided to support the porous body having gas-liquid separation properties at each of the fuel tanks. The pored plate(s) can be provided on one side of the porous body or on the both sides of the porous body. Preferably the porosity of the pored plate on the side of the high-concentration fuel tank is higher than that on the side of the water fuel tank.

A $CO_2$ gas produced during power generation is discharged from a port connected to the exterior provided beside the fuel electrode of the power generation part. The port is arranged on the high-concentration fuel tank side distanced from the water fuel tank as much as possible and is not provided on the water fuel tank side.

Preferably the $CO_2$ gas discharge port is arranged at a position distanced from the water fuel tank as much as possible The $CO_2$ gas discharge port is preferably plugged by a material having gas-liquid separation properties.

A suppression layer (humidity maintenance layer), to suppress vaporization of generated water, is preferably provided on the oxygen electrode of the power generation part so that the produced water at the oxygen electrode is back-diffused to the fuel electrode to keep sufficient amount of water for the power generation.

According to the present invention having the power generation cell structure as explained above, necessary fuel is gasified and supplied from only the high-concentration fuel tank at a normal state and when water for power generation part has become short due to fluctuation of a load current by operation conditions, etc., water can be gasified and supplied from the water fuel tank.

According to the present invention, when the fuel cell is not operated (during storage), an opening portion(s) of the pored plate(s) of the high-concentration fuel tank is/are closed while the water fuel tank is not closed but opened. By such a storing method, the power generation part can be maintained humid by only water. It contributes to prevent the degradation of the power generation part during storage and makes it possible to shorten a start-up time after storage greatly.

In such a case a porous body having gas-liquid separation properties is preferably provided on the whole surface of the fuel electrode facing the fuel tanks to prevent a leakage of liquid produced at the power generation part to the exterior.

By such a structure, the fuel tanks become detachable from the power generation part independently without liquid leakage and the storage method of the present invention can be realized by easy steps.

Figure 1:
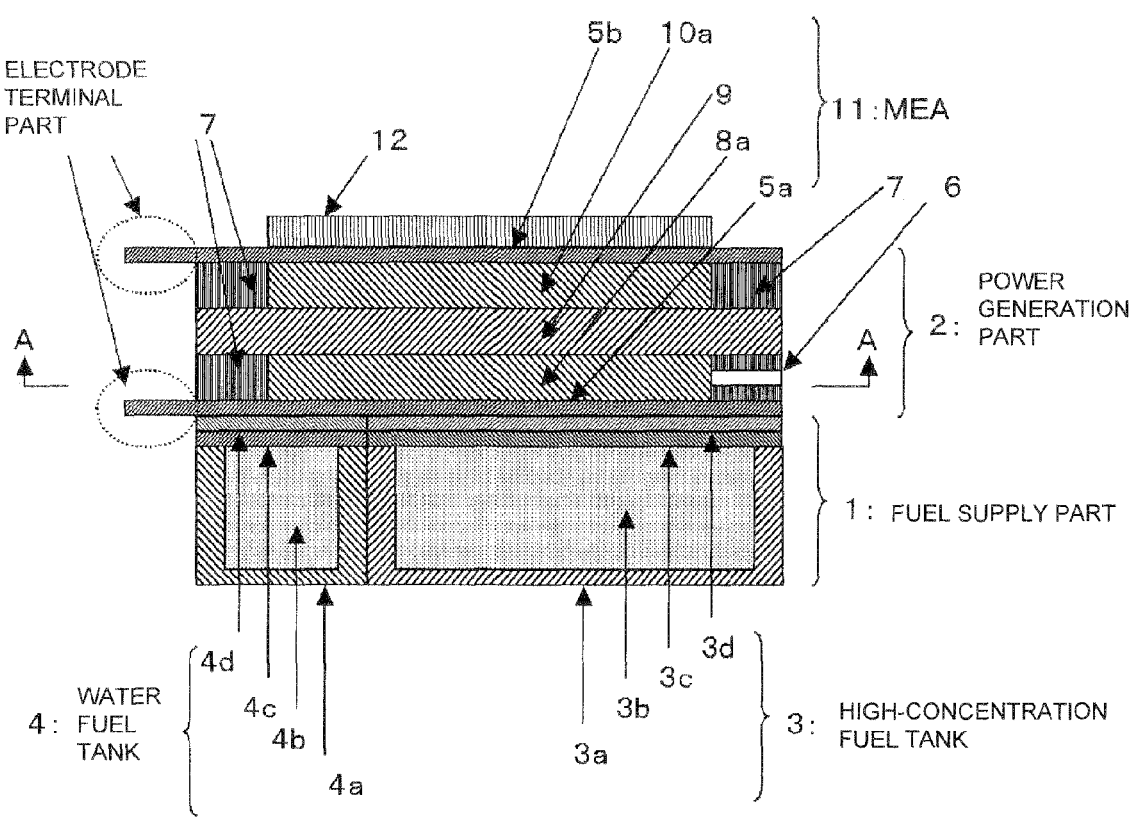
FIG. 1 shows a schematic cross section of a power generation cell structure according to an exemplary embodiment of the present invention.

EXPLANATIONS OF SYMBOLS 1 fuel supply part
2 power generation part
3 high-concentration fuel tank
3a casing part
3b high-concentration fuel storage part
3c gasification/supply part
3d pored plate
(3c+3d: (high-concentration) fuel gasification/supply layer)
4 water fuel tank
4a casing part
4b water fuel storage part
4c gasification/supply part
4d pored plate
(4c+4d: (water) fuel gasification/supply layer)
5 collective electrode
5a collective electrode of fuel electrode
5b collective electrode of oxygen electrode
6 CO2 gas discharge port
7 seal part
8 fuel electrode (5a+8a)
8a fuel electrode catalyst layer
9 solid polymer electrolyte membrane
10 oxygen electrode (5b+10a)
10a oxygen electrode catalyst layer
11 MEA (8+9+10)
12 generated water vaporization suppression layer (humidity maintenance layer)
14 liquid leakage protection portion
20 fuel supply inhibition portion

PREFERRED MODES

A polymer electrolyte fuel cell according to the present invention will be explained in the case of using methanol fuel with reference to drawings. The present invention is not limited to the drawings and embodiments hereinafter.

FIG. 1 shows a schematic cross section of a cell structure according to an exemplary embodiment of the present invention. As shown in FIG. 1, a polymer electrolyte fuel cell according to the present invention comprises a fuel supply part 1 to store and supply fuels and a power generation part 2 to generate electric power by chemical reactions represented by the equations (1) and (2).

The fuel supply part 1 comprises two components formed of a high-concentration fuel tank 3 for storage and supply of a highly-concentrated fuel and water fuel tank 4 for storage and supply of water.

A gasification/supply part 3c having gas-liquid separation properties for gasification/supply of an alcohol fuel and a pored plate 3d for holding the gasification/supply part 3c are provided on a casing part 3a of the high-concentration fuel tank 3. The gasification/supply part 3c and the pored plate 3d constitute a (high-concentration) fuel gasification/supply layer in total. A high-concentration fuel storage part is denoted as 3b.

A porous material having gas-liquid separation properties can be used for the gasification/supply part 3c. For example, a water-repellent porous film such as a PTFE or a hydrophilic ion-exchange film made of a sulfonated styrene-type material, etc. can be used for the porous material. Preferably, a molar ratio of the methanol and water, M(methanol)/W(water), supplied from the high-concentration fuel tank 3 to the power generation part 2 through the gasification/supply part 3c is higher than 1.

More preferably, the gasification/supply part 3c is composed of a water-repellent material and a hydrophilic material, piled up one after another from the high-concentration fuel tank 3 side. Such a structure makes it possible to reduce a backflow of water, produced at the power generation part, to the high-concentration fuel tank 3. The reason for this is assumed that produced water vapor is partially condensed and trapped at the hydrophilic portion and becomes incapable of permeating through the water-repellent material.

The pored plate 3d is necessary for combining the casing part 3a and the gasification/supply part 3c, and in the case where a film is used for the gasification/supply part 3c, the pored plate 3d has a function of preventing a flexion of the film and stabilizing an amount of fuel supplied. Also an opening rate of the pored plate can be easily changed and thus the amount of fuel supplied can be adjusted.

Preferably, the pored plate 3d has the opening rate less than 50%; however, the opening rate is preferably larger than an opening rate of a pored plate used for a water fuel tank to supply water fuel as explained later. A material of the pored plate is preferably a resin such as a PEEK or the like that has good properties of chemical resistance and heat resistance. The thickness of the pored plate is not limited if it can hold the film tightly.

The pored plate 3d may be provided on one side of the gasification/supply part 3c or two pored plates may be provided on both sides of the gasification/supply part 3c so as to sandwich it.

The pored plates 3d and the gasification/supply part 3c can be easily combined with the casing part 3a by a thermo-compression or screwing the frame portion.

Also a gasification/supply part 4c, having gas-liquid separation properties for gasifying and supplying water fuel, and a pored plate 4d to hold the gasification/supply part 4c are provided on a casing part 4a of the water fuel tank 4 for storage and supply of water. The gasification/supply part 4c and the pored plate 4d constitute a (water) fuel gasification/supply layer in total. A water fuel storage part is denoted as 4b.

A water-repellent porous material having gas-liquid separation properties can be used for the gasification/supply part 4c and a porous film such as a PTFE or the like can be used for such porous material. A permeation rate of water supplied from the water fuel tank 4 to the power generation part 2 through the gasification/supply part 4c is preferably smaller than that of the highly-concentrated fuel supplied from the high-concentration fuel tank 3 to the power generation part 2 through the gasification/supply part 3c. In addition, the gasification/supply part 4c preferably has a structure in which a water-repellent material and a hydrophilic material are piled up one after another from the water fuel tank side as well as the side of the high-concentration fuel tank 3 to prevent a back-flow of the highly-concentrated fuel to the water tank 4.

A material for the pored plate 4d may be the same material for the pored plate 3d on the high-concentration fuel tank side; however. the opening rate is preferably 20% or less so that the permeation rate may become smaller than that of the high-concentration fuel tank side. The pored plate 4d may be provided on one side of the gasification/supply part 4c or two pored plates may be provided on both sides of the gasification/supply part 4c so as to sandwich it.

A ratio of the volume of the high-concentration fuel tank 3 to the volume of the water fuel tank 4 (V(high-concentration fuel tank)/V(water fuel tank)) is preferably larger than 4. That is because if the ratio is smaller than 4, high generation efficiency is achieved by supplying fuel in only single concentration.

Next, the power generation part 2 will be explained. As shown in FIG. 1, the polymer electrolyte fuel cell comprises an MEA (Membrane and Electrode Assembly) 11 in which a solid polymer electrolyte membrane 9 is sandwiched between a fuel electrode 8 (collective electrode 5a of fuel electrode and fuel electrode catalyst layer 8a) and an oxygen electrode 10 (collective electrode 5b of oxygen electrode and oxygen electrode catalyst layer 10a), collective electrodes 5a and 5b (each of them is a part of the fuel electrode 8 and the oxygen electrode 10, respectively), $CO_2$ gas discharge port 6, seal part 7 and a product water vaporization suppression layer (humidity maintenance layer) 12.

A material for the solid polymer electrolyte membrane 9 can be available in market (Nafion(registered trademark), for example) and it was used for an example of the present invention. However, the material is not limited to it. The fuel electrode 8 and the oxygen electrode 10 are prepared by forming each catalyst layer 8a and 10a by applying a catalyst paste, which contains carbon particles-supported catalyst on one side of each collective electrode 5a and 5b made by a metal mesh or a carbon cloth. The prepared fuel electrode 8 and oxygen electrode 10 are arranged so that each catalyst layer (8a and 10a) side faces the solid polymer electrolyte membrane 9 and the solid polymer electrolyte membrane 9 sandwiched between the fuel electrode 8 and the oxygen electrode 10 is thermo-compressed to form into the MEA 11.

An electrode terminal part protruding from an edge of each collective electrode 5a and 5b is formed to take the electric power outside. Each of the electrode terminal part of the fuel electrode 8 and the oxygen electrode 10 is preferably arranged so that they are not overlapped each other. No catalyst layer is formed on the electrode terminal parts of the fuel electrode 8 and the oxygen electrode 10.

Preferably the solid polymer electrolyte membrane 9 is formed to be larger than the catalyst layer 8a of the fuel electrode and the catalyst layer 10a of the oxygen electrode so that the fuel electrode 8 and the oxygen electrode 10 are not shorted.

The seal parts 7, whose thickness corresponds to thicknesses of the fuel electrode catalyst layer 8a and the oxygen electrode catalyst layer 10a, are provided on both sides of the solid polymer electrolyte membrane 9 where the fuel electrode catalyst layer 8a and the oxygen electrode catalyst layer 10a are not overlapped. As shown in FIG. 1, the seal parts 7 are arranged at peripheral areas of the fuel electrode catalyst layer 8a and the oxygen electrode catalyst layer 10a. The structure prevents short-circuit of the fuel electrode 8 and the oxygen electrode 10 and restricts a permeation of the fuel through the fuel electrode 8 and the oxygen electrode 10.

A material for the seal part 7 is not limited if it possesses sealing capability and certain degree of insulation capability. A silicone rubber, resin such as PPS or polymer porous body is available, for example.

The $CO_2$ gas discharge port 6 to discharge the $CO_2$ gas produced by the reaction is provided at the seal part 7 on the side of the fuel electrode 8. According to the present invention the $CO_2$ gas discharge port 6 is provided only on the side of the high-concentration fuel tank 3. The $CO_2$ gas discharge port 6 can be formed by partially cutting off the seal part 7 or forming a small pierced hole. The opening ratio of the $CO_2$ gas discharge port 6 depends on a power generation capacity (production rate of the $CO_2$ gas).

Figure 2A:
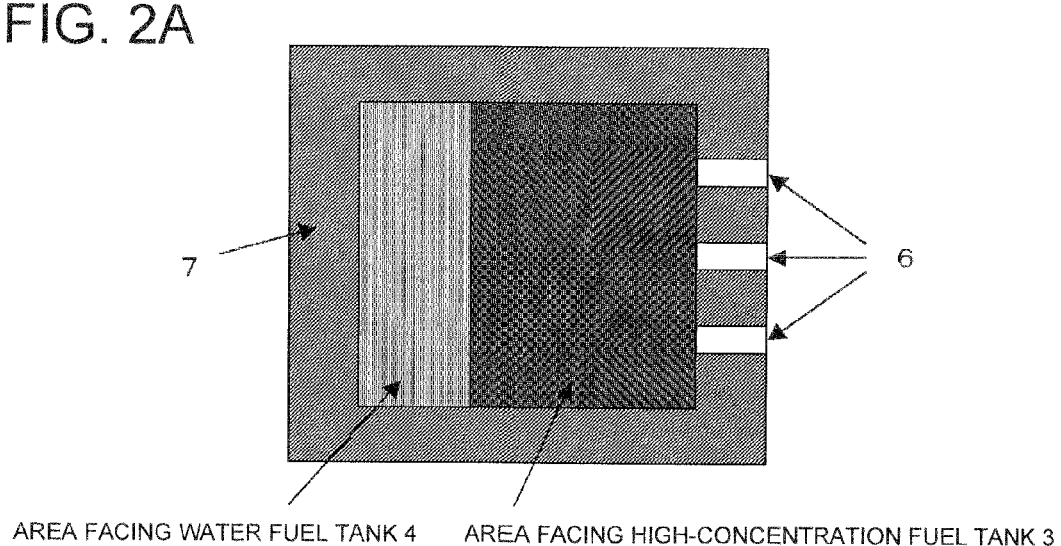
FIG. 2A is a layout of $CO_2$ discharge ports to discharge $CO_2$ gas produced at a fuel electrode arranged on only high-concentration fuel tank side according to an exemplary embodiment of the present invention.
Figure 2B:
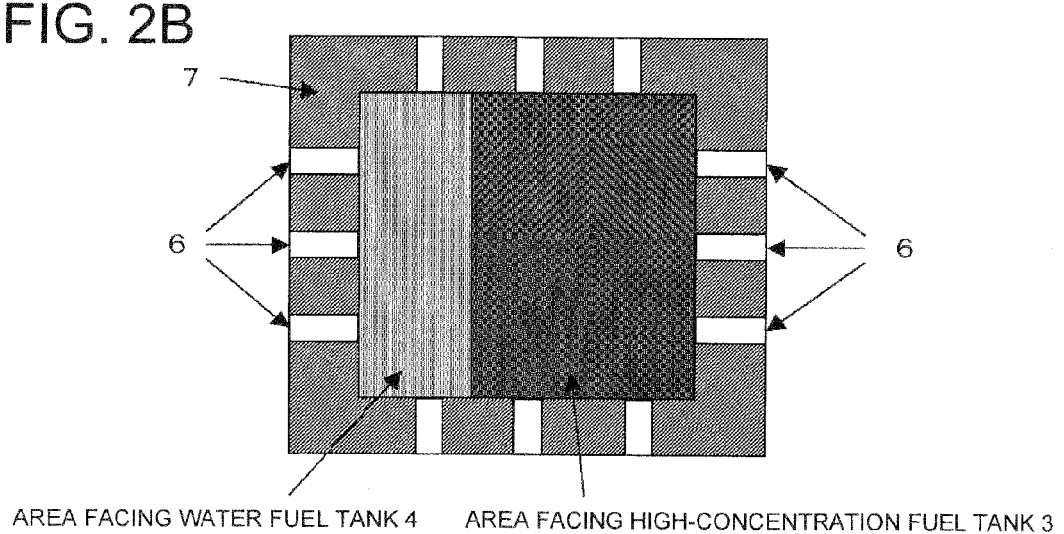
FIG. 2B is a layout of $CO_2$ discharge ports to discharge $CO_2$ gas produced at a fuel electrode arranged at four sides evenly according to a conventional art.

FIG. 2 shows a schematic cross section through A-A line in FIG. 1 including the $CO_2$ gas discharge port 6. The $CO_2$ gas discharge ports 6 may be formed at four sides as shown in FIG. 2B, but preferably formed at the most remote side from the water fuel tank 4 as shown in FIG. 2A. This structure makes it possible to discharge the $CO_2$ gas in one direction and reduce back-flow of the gasified highly-concentrated fuel to the water fuel tank 4. In addition, back-flow of the fuel on the side of the high-concentration fuel tank 3 is also reduced, and therefore constant fuel supply can be achieved.

A material having gas-liquid separation properties is preferably provided at the $CO_2$ gas discharge port 6 so as to prevent leakage of the fuel or the like. A water-repellent gas-liquid separation film can be used for the material or a structure, formed by piling up a hydrophilic material and a water-repellent material one after another from the side of the fuel electrode 8, can be used. The gas-liquid separation film is combined with the seal part 7 by a thermo-compression or the like.

The $CO_2$ gas discharge port 6 is preferably arranged on the lateral side opposite to the electrode terminal part so that the gas discharged from the $CO_2$ gas discharge port 6 does not exert a bad influence on the electrode terminal part.

The product water vaporization suppression layer (humidity maintenance layer) 12 has a function to suppress vaporization of the water produced at the oxygen electrode 10 and makes the produced water back-diffuse to the fuel electrode 8 side so that more constant power generation can be realized. The humidity maintenance layer 12 may be formed by attaching a water-repellent porous film such as a PTFE on the collective electrode 5b of the oxygen electrode, or more preferably, piling up a water-retentive porous body and a water repellent porous body one after another from the collective electrode 5b of the oxygen electrode. A fiber mat, hydrophilic cellulose fiber or glass fiber or the like is preferably used for the water-retentive porous body so that oxygen necessary for the power generation may permeate therethrough.

Preferably the humidity maintenance layer 12 is held by a support plate having perforated small cavities. A material for the support plate is not limited if it possesses heat resistance and chemical resistance as SUS or resin product. The opening ratio of the support plate is preferably 50% or less.

The fuel supply part 1 and the power generation part 2 can be integrated completely. However, a porous body having gas-liquid separation properties may also be provided on the fuel electrode so as to prevent leakage of liquid from the power generation part 2. Such a structure makes the fuel tank easily detachable and improves storage properties remarkably.

Figure 3:
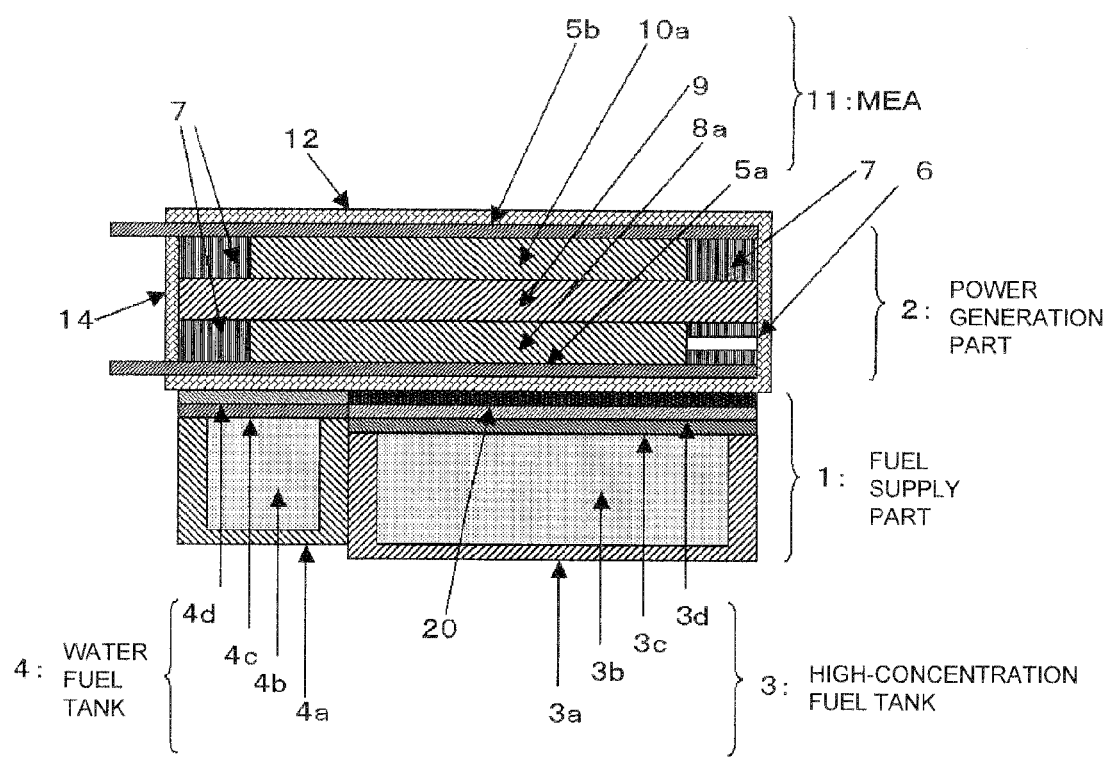
FIG. 3 shows a schematic cross section of a power generation cell structure for storing the power generation cell according to an exemplary embodiment of the present invention.

A structure of this kind may be obtained by wrapping the power generation part 2 with a water-repellent gas-liquid separation film (liquid leakage protection portion 14) as shown in FIG. 3. The gas-liquid separation film (liquid leakage protection portion 14) also takes charge (i.e. shares the functions) of the plugging portion of the $CO_2$ gas discharge port 6 and the humidity maintenance layer 12.

Figure 4:
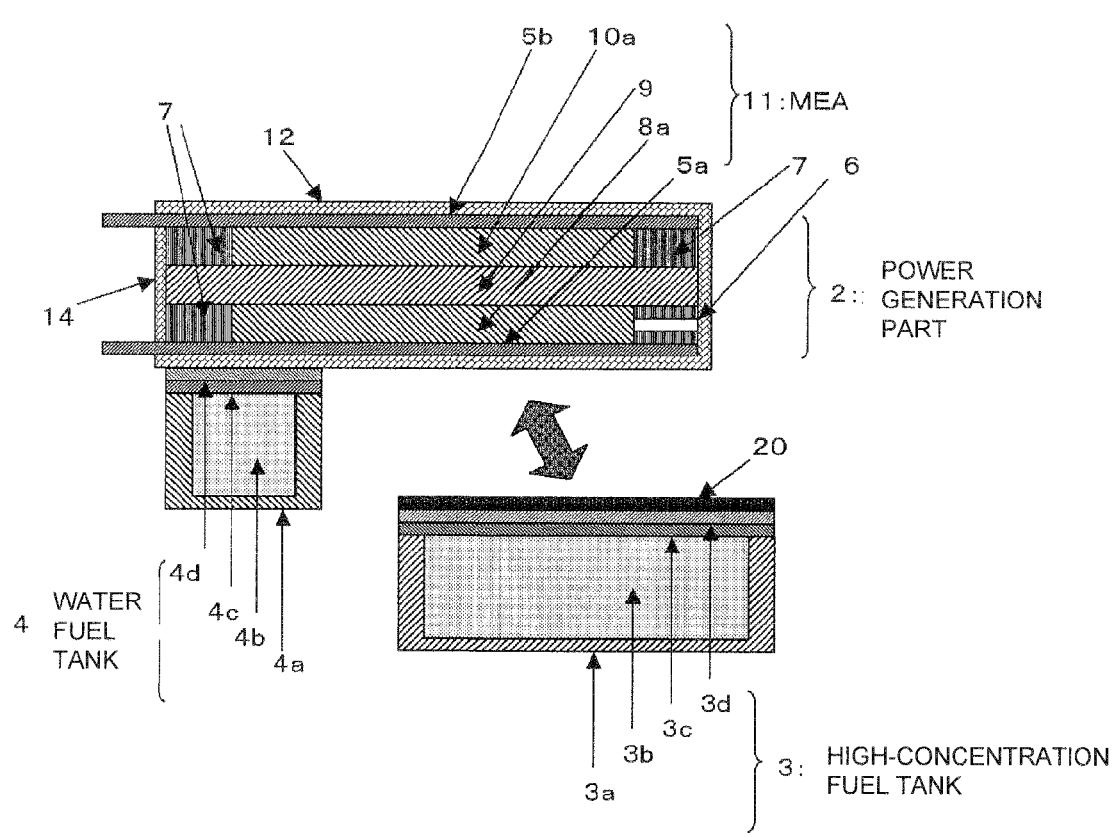
FIG. 4 is a schematic cross section of a high-concentration fuel tank when detached.

According to this structure, the high-concentration fuel tank 3 becomes detachable independently from the power generation part 2 without liquid leakage as shown in FIG. 4.

According to the present invention, when storing the generation cell, a fuel supply inhibition portion 20 is attached only on the side of the high-concentration fuel tank 3 to prevent fuel supply to the power generation part 2 and the water fuel tank 4 is opened.

By the method, the power generation part 2 is humidified by only water during the storage period, and therefore, it suppresses degradation of the electrodes and makes a start-up time after storage short.

The fuel supply inhibition portion 20 may be formed by attaching a metal plate or polymer material having a low gas permeation property and stickiness on, one side on the pored plate 3d of the high-concentration fuel tank 3, for example.

According to a storage sequence of the present invention, the high-concentration fuel tank 3 is detached after power generation and the fuel supply inhibition portion 20 is attached on the pored plate 3d, and then the high-concentration fuel tank 3 is combined with the power generation part 2 and stored in this state. When reusing the cell after storage, the high-concentration fuel tank 3 is detached and the fuel supply inhibition portion 20 is removed. And then the high-concentration fuel tank 3 is combined with the power generation part 2. Preferably the humidity maintenance layer 12 and the $CO_2$ gas discharge port 6 are sealed by the same material as the fuel supply inhibition portion 20 or the like.

The fuel supply inhibition portion 20 may be provided on both of the fuel tanks 3 and 4. However, the power generation part 2 tends to become dry after a long storage period, and therefore, a start-up property is not so good unless the power generation part 2 is closed completely.

EXAMPLE 1

A polymer electrolyte fuel cell according to an example 1 of the present invention will be explained. A polymer electrolyte fuel cell of a single cell structure as shown in FIG. 1 is fabricated by the following method.

As for preparation of the oxygen electrode 10, at first a fine carbon particles-supported catalyst is prepared by making platinum fine particles in the range of 3 to 5 nm in particle diameter supported on carbon particles (Lion corporation, Ketjenblack EC600JD) at 55% in weight. Then an appropriate volume of 5 weight-% Nafion solution (Du Pont, DE521, Nafion is a registered trademark of Du Pont) is added into 1 g of the carbon particles-supported catalyst and stirred to obtain a catalyst paste for the oxygen electrode (which corresponds to the oxygen electrode catalyst layer 10a). The catalyst paste is applied on a collective electrode 5b made of metal in the amount of 1 to 8 mg/cm² and dried into an oxygen electrode 10. A metal mesh (0.5 mm thick, porosity 50%) of SUS 316L is used for the collective electrode 5b. The shape of the metal mesh is a square of 4 cm×4 cm and an electrode terminal part of 5 mm wide and 10 mm long is formed at the edge of the square. The catalyst paste is applied on other portion than the electrode terminal part.

As for preparation of the fuel electrode 8, a catalyst paste for the fuel electrode 8 is prepared by the same method as for the oxygen electrode 10 except that platinum (Pt)-Ruthenium (Ru) alloy particles ranging 3 to 5 nm in particle diameter are used for the catalyst instead of platinum particles for the oxygen electrode 10. The fuel electrode 8 is prepared by the same conditions and structure as those of the oxygen electrode 10 except the catalyst paste.

Next, a 4.5 cm×4.5 cm×180 μm thick film made of Nafion 117 by Du Pont is used as a solid polymer electrolyte membrane 9. An oxygen electrode 10 is arranged on one side of the solid polymer electrolyte membrane 9 in a direction that the collective electrode 5b faces outside and a fuel electrode 8 is arranged on the other side of the solid polymer electrolyte membrane 9 in a direction that the collective electrode 5a faces outside, and then they are thermo-compressed. Thus the oxygen electrode 10 and the fuel electrode 8 are connected to the solid polymer electrolyte membrane 9 resulting in an MEA 11.

Next, seal parts 7 made of (hollow) frame-shaped polypropylene resin (rectangular frame cut out into outer side of from 45 mm×45 mm×0.5 mm thick square remaining 5 mm in frame width) are attached at portions on both sides of the solid polymer electrolyte membrane 9 of the MEA 11 where the oxygen electrode catalyst layer 10a and a fuel electrode catalyst layer 8a are not formed. Then $CO_2$ gas discharge ports 6 are formed at three points on one side of the seal part 7 on the fuel electrode 8 side by cutting out by 2 mm wide and 5 mm long each. Four holes 1 mm in diameter are perforated for screwing on two sides of the resin frame.

Next, the MEA 11 with the seal part 7 is wrapped by a gas-liquid separation film (liquid leakage protection portion 14) (PTFE porous film of 100 μm thickness, diameter of cavity 1 μm, porosity 60%) of 50 mm wide and 95 mm long. A polyimide-type adhesive is thinly applied on the seal part 7 before folding the film and then the gas-liquid separation film is put on the portion where the $CO_2$ gas discharge ports 6 are formed on the seal part 7 and the film is folded at a half position.

Next, a polyimide-type adhesive is applied onto a portion of 2.5 mm wide at three open edges of the liquid leakage protection portion 14 wrapping the MEA 11 (including the seal part 7) and the edges are sealed by thermo-compression. A pored SUS 316L plate (45 mm×45 mm, 0.5 mm thick, opening rate 20%) was used to support a humidity maintenance layer 12. Screwing holes were perforated on the support plate at positions corresponding to the seal part 7.

Next, two fuel tanks 3 and 4 were prepared as follows. At first, a casing 3a (external dimensions: 45 mm×35 mm×12.5 mm, wall thickness 2.5 mm, storage part dimensions: 40 mm×30 mm×10 mm) for the high-concentration fuel tank 3 and a casing 4a (external dimensions: 45 mm×10 mm×12.5 mm, wall thickness 2.5 mm, storage part dimensions: 40 mm×5 mm×10 mm) for the water fuel tank 4 were prepared. Four and three screwing holes (1 mm in diameter each) equally spaced to connect with the power generation part 2 were provided on the walls in the longitudinal direction and in the width direction, respectively. A fuel injection hole was perforated at each lateral side of the tank.

Next, a PTFE film (100 μm thick, porosity 50%), a Nafion 112 film (Du Pont) and a pored SUS plate 3d (porosity 40%, 0.5 mm thick), all of which have the same external dimensions as those of the high-concentration fuel tank 3, were piled up on the high-concentration fuel tank 3 as a gasification/supply part 3c, and thermo-compressed with an adhesive into one unified body.

Four and two screwing holes (1 mm in diameter each) equally spaced to connect the unified body with the power generation part were provided at the longitudinal side and at corners in the short (width) direction, respectively.

Then a PTFE film (200 μm thick, porosity 50%), a Nafion 117 film (Du Pont) and a pored SUS plate 4d (porosity 20%, 0.5 mm thick), all of which have the same external dimensions as those of the water fuel tank 4, were piled up on the water fuel tank 4 as a gasification/supply part 4c, and thermo-compressed with an adhesive into one unified body.

These two fuel tanks 3 and 4 and power generation part 2 (without fuel supply inhibition portion 20) are arranged as shown in FIG. 3 and the fuel supply part 1 and the power generation part 2 were screwed and combined to obtain a generation cell finally. After injecting 70% v/v methanol solution into the high-concentration fuel tank 3 and pure water into the water fuel tank 4, the fuel tanks were plugged.

[Comparison 1]

A generation cell similarly structured as the cell of example 1 except that the fuel tank is composed of only a high-concentration fuel tank (external dimensions of a casing part: 45 mm×45 mm×12.5 mm, thickness: 2.5 mm, storage part: 40 mm×40 mm×10 mm) was prepared. The fuel was only a 70% v/v methanol solution.

[Comparison 2]

A generation cell, similarly structured as the cell of example 1 except that $CO_2$ gas discharge ports 6 of a power generation part 2 were formed at four sides as shown in FIG. 2B, was prepared.

EXAMPLE 2

Figure 5:
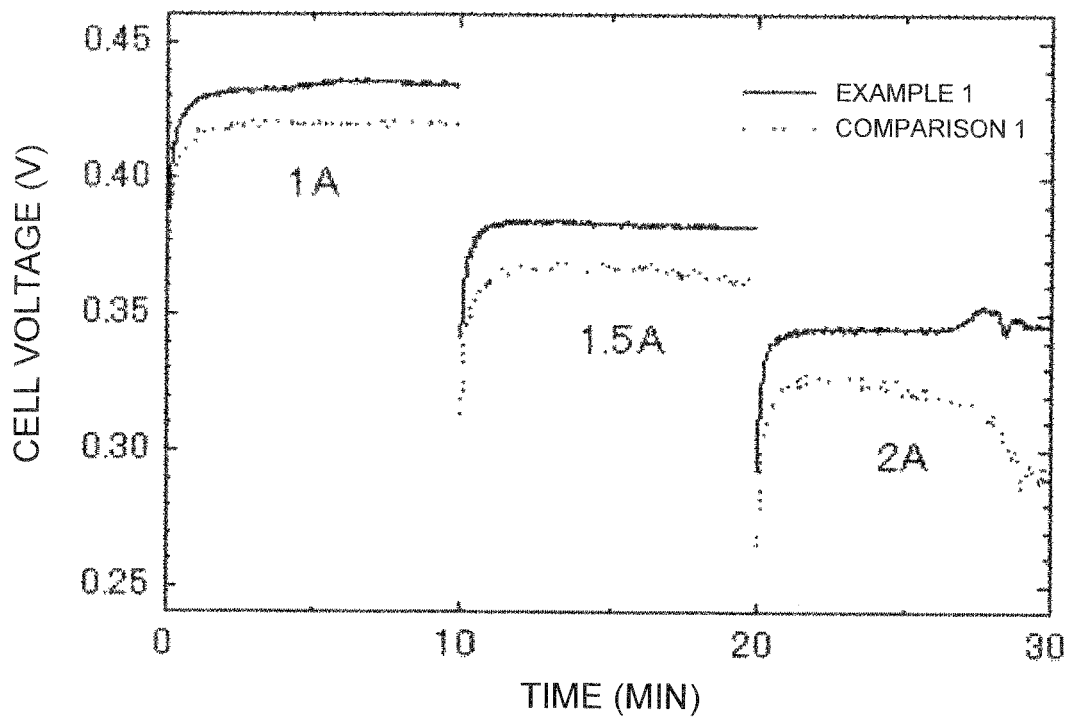
FIG. 5 is a graph of an example 2 showing changes of cell voltages versus time with constant current loads by power generation cells of example 1 and comparison 1.

Generation powers of the generation cells of example 1 and comparison 1 were evaluated under constant current load conditions. FIG. 5 shows results of measured cell voltages under constant current load of 1 A, 1.5 A and 2 A in ten minuets each. As shown in FIG. 5, the generation cell according to the present invention can generate power constantly. On the other hand, in the case of the cell of comparison 1 according to a conventional structure, when the load current was changed, a rising speed of a cell voltage was slowed down and a fluctuation of the cell voltage was larger compared to the present invention. Thus a constant generation properties of the present invention has been proved even when a current load is changed.

EXAMPLE 3

Figure 6:
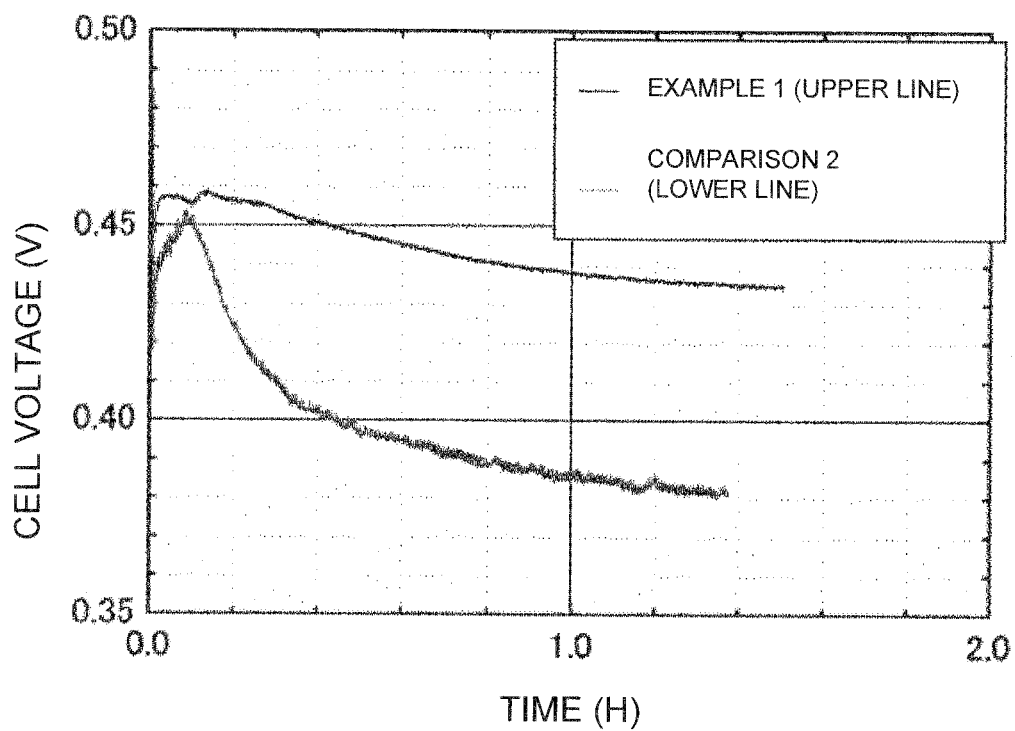
FIG. 6 is a graph of an example 3 showing changes of cell voltages versus time with a constant current load by power generation cells of example 1 and comparison 2.

A generation power test was performed using the generation cell of example 1 and the generation cell of comparison 2. FIG. 6 shows changes of cell voltages versus time. The generation cell according to a conventional structure having $CO_2$ gas discharge ports 6 equally spaced at four sides showed a larger reduction of its cell voltage versus time compared to the generation cell according to the present invention having $CO_2$ gas discharge ports 6 formed only on the high-concentration fuel tank 3 side. The concentration of methanol in the water fuel tank 4, which was measured after generation, was about 3% v/v; however, the methanol concentration of a conventional structure, having $CO_2$ gas discharge ports 6 formed evenly at four sides, was approximately 20% v/v. The reason of these differences was that the structure of the present invention, having $CO_2$ gas discharge ports 6 formed only on the side of the high-concentration fuel tank 3, could restrict a back-flow of the fuel from the fuel electrode 8 to the water fuel storage part 4*b*. As result constant generation properties were realized.

EXAMPLE 4

Here, storage properties of the cell structure according to the present invention were examined The generation cell of an example 1 was stored by the following procedure. At first, power was generated for one hour at a constant current of 1 A. Then the high-concentration fuel tank 3 was detached and the pored plate 3*d* of the high-concentration fuel tank 3 was sealed by a polyimide film (fuel supply inhibition portion, 50 μm thick) on whose one side an adhesive was applied. Then the high-concentration fuel tank 3 was attached to the generation part 2 again and the entirety of the fuel cell was enclosed in a plastic (vinyl) bag.

Next, a comparison test was performed by the following procedure. The generation cell of example 1 was prepared and power was generated for one hour at a constant current of 1 A. Then both of the fuel tanks 3 and 4 were detached. And the pored plates 3*d* and 4*d* of the fuel tanks 3 and 4 were sealed by polyimide films (fuel supply inhibition portion 20, 50 μm thick) on whose one side an adhesive was applied, respectively. Then the fuel tanks were attached to the generation part 2 again and the entirety of the fuel cell was enclosed in a plastic (vinyl) bag.

In addition, one more comparison test was performed. A generation cell of comparison 1 was prepared and power was generated for one hour at a constant current of 1 A. Then the generation cell was enclosed in a plastic bag leaving the fuel tanks 3 and 4 attached to the generation part 2 without sealing them.

After one week of storage of the three kinds of generation cells, the polyimide films (fuel supply inhibition portion 20) were removed and the generation powers were tested at 1 A current again. As a result, the generation cell in which only the high-concentration fuel tank 3 was sealed achieved about 95% of the initial cell voltage after running for about 30 minutes from the beginning of generation. The cells in which both of the fuel tanks 3 and 4 were sealed recovered only up to about 80% of the initial cell voltage after one hour of generation. The cell of comparison 1 in which both fuel tanks 3 and 4 were not sealed showed only about 60% of the initial cell voltage after one hour of generation.

According to the storage method of the present invention, it has been proved that the generation properties can be kept, and the start-up time can be shortened as well.

It should be noted that other objects, features and aspects of the present invention will become apparent in the entire disclosure and that modifications may be done without departing the gist and scope of the present invention as disclosed herein and claimed as appended herewith. Also it should be noted that any combination of the disclosed and/or claimed elements, matters and/or items may fall under the modification aforementioned.

The invention claimed is:

1. A polymer electrolyte fuel cell comprising:
a power generation part as an electrolyte membrane-electrode assembly formed of a solid polymer electrolyte membrane, a fuel electrode arranged in contact with one side of the solid polymer electrolyte membrane and an oxygen electrode arranged in contact with the other side of the membrane; and
a fuel supply part for storing and supplying an alcohol fuel to the fuel electrode,
wherein the fuel supply part is composed of a highly-concentration fuel tank for storing and supplying a highly-concentrated fuel and a water fuel tank for storing and supplying a water fuel, and wherein the fuel is gasified and supplied to the power generation part through a fuel gasification/supply layer provided at least between the high-concentration fuel tank and the fuel electrode,
wherein a porous body having gas-liquid separation properties is provided on the fuel electrode of the power generation part so that the two fuel tanks are independently detachable from the power generation part.

2. A polymer electrolyte fuel cell comprising:
a power generation part as an electrolyte membrane-electrode assembly formed of a solid polymer electrolyte membrane, a fuel electrode arranged in contact with one side of the solid polymer electrolyte membrane and an oxygen electrode arranged in contact with the other side of the membrane; and
a fuel supply part for storing and supplying an alcohol fuel to the fuel electrode,
wherein the fuel supply part is composed of a highly-concentration fuel tank for storing and supplying a highly-concentrated fuel and a water fuel tank for storing and supplying a water fuel, and wherein the fuel is gasified and supplied to the power generation part through a fuel gasification/supply layer provided at least between the high-concentration fuel tank and the fuel electrode, and
wherein the fuel gasification/supply layer is formed of a porous body having gas-liquid separation properties and one or two pored plates to support the porous body, at a position between the two fuel tanks and the fuel electrode or between the high-concentration fuel tank and the fuel electrode,
wherein opening portions of the pored plate of the high-concentration fuel tank are sealed while the water fuel tank remains opened without sealing, for storing at the time of non-power generation.

* * * * *

UNITED STATES PATENT AND TRADEMARK OFFICE
CERTIFICATE OF CORRECTION

PATENT NO. : 8,524,418 B2  Page 1 of 1
APPLICATION NO. : 12/527812
DATED : September 3, 2013
INVENTOR(S) : Kobayashi et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 453 days.

Signed and Sealed this

Fifteenth Day of September, 2015

Michelle K. Lee
*Director of the United States Patent and Trademark Office*